US 8,763,952 B2

(12) United States Patent
Haramburu et al.

(10) Patent No.: US 8,763,952 B2
(45) Date of Patent: Jul. 1, 2014

(54) ENGINE MOUNTING STRUCTURE FOR AIRCRAFT HAVING A BEAM SPREADER CONNECTED AT FOUR POINTS

(75) Inventors: Eric Haramburu, Toulouse (FR); Laurent Sammito, Toulouse (FR); Jean Larrochelle, Toulouse (FR)

(73) Assignee: Airbus Operations S.A.S., Toulouse (FR)

( * ) Notice: Subject to any disclaimer, the term of this patent is extended or adjusted under 35 U.S.C. 154(b) by 1015 days.

(21) Appl. No.: 12/668,030

(22) PCT Filed: Jul. 8, 2008

(86) PCT No.: PCT/EP2008/058814
§ 371 (c)(1),
(2), (4) Date: Jan. 7, 2010

(87) PCT Pub. No.: WO2009/007354
PCT Pub. Date: Jan. 15, 2009

(65) Prior Publication Data
US 2010/0181419 A1 Jul. 22, 2010

(30) Foreign Application Priority Data
Jul. 9, 2007 (FR) ..................................... 07 56361

(51) Int. Cl.
*B64D 27/00* (2006.01)
(52) U.S. Cl.
USPC ................................ 244/54; 248/554; 60/797
(58) Field of Classification Search
USPC .......... 244/54, 55; 248/554–557; 60/796, 797
See application file for complete search history.

(56) References Cited

U.S. PATENT DOCUMENTS

| 5,320,307 | A  | * | 6/1994  | Spofford et al. | 244/54 |
| 5,725,181 | A  | * | 3/1998  | Hey | 244/54 |
| 6,347,765 | B1 | * | 2/2002  | Jule et al. | 244/54 |
| 6,474,597 | B1 | * | 11/2002 | Cazenave | 244/54 |
| 6,494,403 | B2 | * | 12/2002 | Jule et al. | 244/54 |
| 6,758,438 | B2 | * | 7/2004  | Brefort et al. | 244/54 |
| 7,021,585 | B2 | * | 4/2006  | Loewenstein et al. | 244/54 |
| 7,108,224 | B2 | * | 9/2006  | Pasquer et al. | 244/54 |
| 7,566,029 | B2 | * | 7/2009  | Dron et al. | 244/54 |

(Continued)

FOREIGN PATENT DOCUMENTS

| EP | 0 805 108 | 11/1997 |
| EP | 1 493 663 | 1/2005  |
| FR | 2 887 850 | 1/2007  |

OTHER PUBLICATIONS

U.S. Appl. No. 12/663,430, filed Dec. 7, 2009, Haramburu, et al.

*Primary Examiner* — Tien Dinh
*Assistant Examiner* — Steven Hawk
(74) *Attorney, Agent, or Firm* — Oblon, Spivak, McClelland, Maier & Neustadt, L.L.P.

(57) ABSTRACT

An engine mounting structure for aircraft including an engine mounting system including a device for transmission of the thrust efforts fitted with two lateral connecting rods and with a spreader beam mounted in connected fashion on a support element, through a principal connecting device defining a principal spreader beam hinge line positioned in a plane. The spreader beam is also mounted in connected fashion with some play on the element, using a secondary connecting device located at some distance, as seen from above, from the device, and defining a secondary spreader beam hinge line, which is also positioned in a plane. The rotation of the spreader beam is stopped by device coming into contact with the spreader beam.

11 Claims, 6 Drawing Sheets

(56) References Cited

U.S. PATENT DOCUMENTS

| | | | |
|---|---|---|---|
| 7,891,604 B2* | 2/2011 | Combes et al. | 244/54 |
| 7,950,604 B2* | 5/2011 | Combes et al. | 244/54 |
| 8,256,708 B2* | 9/2012 | Guillet et al. | 244/54 |
| 8,342,473 B2* | 1/2013 | Foster et al. | 248/554 |
| 8,443,612 B2* | 5/2013 | Foster | 60/797 |
| 2001/0025902 A1* | 10/2001 | Jule et al. | 244/54 |
| 2003/0025033 A1* | 2/2003 | Levert et al. | 244/54 |
| 2003/0066928 A1* | 4/2003 | Brefort et al. | 244/54 |
| 2004/0251380 A1* | 12/2004 | Pasquer et al. | 244/54 |
| 2005/0067528 A1* | 3/2005 | Loewenstein et al. | 244/54 |
| 2007/0069068 A1* | 3/2007 | Lafont et al. | 244/54 |
| 2007/0069069 A1* | 3/2007 | Diochon et al. | 244/54 |
| 2008/0197233 A1* | 8/2008 | Combes et al. | 244/54 |
| 2008/0197262 A1* | 8/2008 | Combes | 248/554 |
| 2008/0251633 A1* | 10/2008 | Journade et al. | 244/54 |
| 2010/0116926 A1* | 5/2010 | Combes et al. | 244/54 |
| 2010/0170980 A1* | 7/2010 | Haramburu et al. | 244/54 |
| 2011/0114786 A1* | 5/2011 | Guillet et al. | 244/54 |

* cited by examiner

ENGINE MOUNTING STRUCTURE FOR AIRCRAFT HAVING A BEAM SPREADER CONNECTED AT FOUR POINTS

TECHNICAL FIELD

The present invention relates generally to an engine unit for an aircraft, of the type comprising an engine, an engine mounting structure, and an engine mounting system with multiple engine fasteners, which is interposed between a rigid structure of the engine mounting structure and the engine.

The invention also relates to such an aircraft engine mounting structure.

The invention may be used in any type of aircraft fitted, for example, with jet engines or turboprop engines.

This type of engine mounting structure, also called an "EMS", allows, for example, a turboshaft engine to be suspended beneath the wing surface of the aircraft, or indeed allows this turboshaft engine to be mounted above this same wing surface.

STATE OF THE PRIOR ART

Such an engine mounting structure is, indeed, designed to constitute the linking interface between an engine such as a jet engine and a wing surface of the aircraft. It enables the efforts generated by its jet engine to be transmitted to the structure of this aircraft, and also allows conveyance of the fuel, and passage of the electrical, hydraulic and air systems, between the engine and the aircraft.

In order to transmit the efforts, the structure comprises a rigid part, also called the "primary" structure, often of the "caisson" type, i.e. formed by the assembly of upper and lower stringers and of two lateral panels connected one to the other by means of transverse ribs.

Secondly, the structure is fitted with an engine mounting system interposed between the jet engine and the rigid part of the structure; this system comprises, overall, at least two engine fasteners, generally one front fastener and one rear fastener.

In addition, the mounting system comprises a system for transmission of the thrust efforts generated by the jet engine. In the prior art, this device takes, for example, the form of two lateral connecting rods connected on the one hand to a rear part of the fan casing of the jet engine, and also to a spreader beam, which is itself connected to a rear engine attachment strut attached to the caisson. Alternatively, the beam spreader may be mounted connected to a separate support element from the rear engine attachment strut, for example positioned in fixed fashion on the caisson, between the front and rear engine fasteners.

Similarly, the engine mounting structure also comprises a second mounting system interposed between the rigid part of this structure and the wing surface of the aircraft, where this second system is habitually comprised of two or three attachments.

Finally, the structure has a secondary structure providing segregation between, and maintenance of, the systems, whilst supporting aerodynamic fairings.

In the embodiments of the prior art, the device transmitting the thrust efforts has a particular design incorporating safety/emergency functions known as "Fail Safes", enabling the thrust efforts to be transmitted to the wing surface even in the event of a failure, which may for example take the form of a fracture of a lateral connecting rod or a connecting device forming the link between one of the lateral connecting rods and the beam spreader, or again the fracture of the connecting device of the beam spreader relative to the structure caisson.

To obtain these "Fail Safe" functions, the links may be duplicated. As an example, the beam spreader's connecting device takes the form of a system of shafts incorporating two concentric devices, one of which is at standby, i.e. remaining inoperative for as long as the principal device is not subject to a failure. Alternatively, both concentric shafts can work jointly in normal mode.

Concerning the lateral connecting rods transmitting the thrust efforts, their rear ends are often made more complex through the incorporation of an additional link, known as a "standby", with the attachment strut of the rear engine fastener, as this is notably known from documents EP 1 136 355 and U.S. Pat. No. 6,494,403. These configurations not only imply a complex design of the rear part of the engine mounting system, which leads to substantial and consequently costly assembly and disassembly times, but also lead to high encumbrance, and also an appreciably penalising overall mass.

Another solution permitting a response to the fracture of one of the two thrust efforts transmission connecting rods consists in designing a system of symmetrical stops on the rear engine attachment strut, allowing the rotation of the spreader beam, which is henceforth connected only by a single one of the two connecting rods, to be restricted. In this case the lateral end of the spreader beam which supports the failing connecting rod actually comes into contact with its associated stop, thus stopping the rotation of the spreader beam, which is still connected to the non-failing connecting rod at its opposite lateral end. Such a solution is known from document EP 0 805 108. It has the disadvantage of requiring a substantial encumbrance, notably in relation to its spreader beam, the lateral ends of which must be over-dimensioned in order to be brought as close as possible to their respective stops on the rear engine attachment strut.

Both the technical solutions presented above, enabling a response to be found to the fracture of one of the lateral thrust efforts transmission connecting rods, also have a joint disadvantage in the combination of a substantial number of separate force pathways which must find their way through the rear part of the engine mounting system, making its design quite complicated and bulky. For example, two different safety force pathways are designed, to provide a solution to the failure of one and the other of the two lateral connecting rods, respectively.

OBJECT OF THE INVENTION

The purpose of the invention is therefore to provide an engine mounting structure for an aircraft at least partially providing a solution to the disadvantages mentioned above, compared with the embodiments of the prior art.

To accomplish this the object of the invention is an engine mounting structure for aircraft engine, where the said structure comprises a rigid structure forming a caisson, together with an engine mounting system mounted on the said rigid structure and notably comprising a device for transmission of the thrust efforts generated by the engine, comprising two lateral connecting rods and a spreader beam mounted in connected fashion on a support element which is fixed relative to the said caisson, through a principal spreader beam connecting device positioned between two lateral ends of the said spreader beam, on to which the said two lateral connecting rods are respectively connected, and where the said principal spreader beam connecting device defines a principal spreader beam hinge line positioned in a plane (P) extending in vertical and longitudinal directions from the said rigid structure. In addition, the said spreader beam is mounted in connected fashion on the said support element, using a secondary spreader beam connecting device located at some remove, as seem from above, from the said spreader beam principal connecting device, and defining a secondary spreader beam hinge line, also positioned in the said plane (P), where the said secondary spreader beam connecting device is supported either by the spreader beam or the said support element, and traversing with a play the other of these two elements.

According to the invention, the structure is designed such that in the event of a failure of either one of the two lateral connecting rods, the rotation of the said spreader beam around the principal spreader beam hinge line is stopped by the said secondary spreader beam connecting device coming into contact with the said other of the two elements.

Thus, in normal thrust efforts transmission mode, the efforts transit in a traditional manner successively through the lateral connecting rods, the lateral ends of the spreader beam, the spreader beam's connecting device, and finally the support element which is fixed relative to the rigid structure. Due to the play allowed for the link incorporating the secondary spreader beam connecting device, this link remains inoperative in the transmission of the efforts for as long as the normal transmission mode continues, i.e. for as long as the thrust efforts transmission device is not subject to failure. This also enables an isostatic unit to be retained in normal mode.

The specificity of the invention therefore lies in the pathway along which the efforts transit, in the event of a failure occurring in the transmission device. Indeed, in the event of a failure of a lateral connecting rod taking, for example, the form of a fracture of this connecting rod, or again of a fracture of a connecting device establishing the link between the lateral connecting rod and the spreader beam, or between this same connecting rod and the engine casing, the other non-failing connecting rod tends to make the spreader beam swivel in the principal spreader beam hinge line, until the standby link incorporating the secondary spreader beam connecting device becomes active, due to the fact that parts initially having some play between them come into contact.

Consequently, despite the failure of one of the lateral connecting rods, the spreader beam remains connected at three points, forming for example a V-shape, the point of which is constituted by the principal spreader beam connecting device. It must be understood that the further the secondary spreader beam connecting device is from the principal spreader beam connecting device, the greater the observed leverage, and therefore the less high are the efforts transiting through the principal connecting device. This advantageously enables a reasonable dimensioning for the primary and secondary connecting devices, and also for their surrounding elements, which are non-penalising in terms of mass and encumbrance.

With this regard, it is preferable that in a plane (P') of the spreader beam, the distance (d1) between the principal spreader beam hinge line and each connecting rod rear end hinge line is less than or equal to the distance (d2) between the principal spreader beam hinge line and the secondary spreader beam hinge line. Even more preferentially, the ratio between (d2) and (d1) can be between 1 and 3, and even more preferentially still of around 2.

Above all, the rear ends of the lateral connecting rods no longer require the incorporation of an additional link in order to respond to a possible fracture of the linking device with the associated lateral end of the spreader beam, since in the latter case the efforts are transmitted in the original manner described above, specific to the present invention. Thus, the design of the whole of the rear part of the engine mounting system is able to be simplified.

The design is also greatly simplified compared to that found previously, due to the fact that the safety thrust force pathway is roughly identical, in whichever of the two connecting rods the failure occurs. Indeed, the efforts transmitted to the spreader beam by the non-failing connecting rod pass in both cases successively through the principal connecting rod connecting device, the longitudinal extension of the spreader beam, the secondary spreader beam connecting device having become active, the support element, and then the rigid structure of the engine mounting structure. In other words, whichever of the two connecting rods is failing, it is the same secondary spreader beam connecting device which enables the stop stopping the rotation of the spreader beam to be established.

It is, therefore, advantageously no longer necessary to have two separate safety force pathways to respond to the failure of one and the other of the two lateral connecting rods, respectively, as was previously the case.

Moreover, in the event of a failure taking the form of a fracture of the principal spreader beam connecting device, the standby link incorporating the secondary spreader beam connecting device becomes active, through the fact that parts initially assembled with some play between them come into contact. Consequently, despite the failure of this principal device, the spreader beam remains connected at three points, preferably forming a V-shape, the point of which is constituted by the secondary spreader beam connecting device, and the two ends of which remain connected to the lateral connecting rods. Due to the location of the secondary hinge line in plane (P), the efforts transiting through the two lateral connecting rods can advantageously be balanced in identical or similar fashion to that found in normal mode, using the principal connecting device.

It is no longer necessary to have a twin connecting device, since a single device is indeed sufficient, due to the existence of the safety force pathway specific to the present invention. The overall mass and the encumbrance of the thrust efforts transmission device are advantageously reduced thereby.

Preferably, the said engine mounting system notably comprises a rear engine fastener comprising an attachment strut to which is connected at least one shackle, also intended to be connected to the engine, where the said support element is the said attachment strut. However, an alternative would be to have a support element separate from the rear engine attachment strut, preferably positioned in fixed fashion on the caisson, between the front engine fastener and the rear engine fastener.

The said spreader beam preferably takes the form of a T or a three-branched star. More generally, it takes the form of a part with three arms linked at one central point, through which passes the principal spreader beam hinge line, where the distal ends of the three arms are traversed respectively by the two connecting rod hinge lines, and the principal spreader beam hinge line.

In the first case, considering that the T is constituted by a base and a bar, the connecting rods are connected at the ends of the bar, the link with play incorporating the secondary spreader beam connecting device is located at the free end of the base, and the active link incorporating the principal spreader beam connecting device is located at the intersection between the base and the bar of the T. The abovementioned arrangement is given only as an example and can, clearly, be modified in line with the requirements found. For example, the active link incorporating the principal spreader beam connecting device could be located between the free end of the base and the intersection between the base and the bar, with the base preferably remaining positioned in the longitudinal direction of the structure, as seen from above.

In the second case of the star, it is possible that the connecting rods are each connected to a free end of a branch of the star, the link with some play incorporating the secondary spreader beam connecting device is located at the free end of the third branch of the star, and the active link incorporating the principal spreader beam connecting device is located at the intersection of the three branches.

The said spreader beam is preferentially positioned in a plane corresponding to a plane defined by the said lateral thrust efforts transmission connecting rods. Consequently, it preferably has a roughly flat shape.

Also preferentially, the said plane (P) constitutes a symmetry plane for the rigid structure and for the engine mounting system (11). More generally, plane (P) constitutes, overall, a vertical symmetry plane for the engine mounting structure unit.

The said secondary spreader beam connecting device is preferably located towards the rear, as seen from above, compared to the said principal spreader beam connecting device. A reverse solution in which it is located towards the front could naturally be envisaged, without going beyond the scope of the invention.

Finally, the attachment strut has a transverse beam on to which is attached an emergency bracket traversed, with some play, by the said secondary connecting device. Alternatively, this secondary device could traverse, with some play, the transverse beam itself, without going beyond the scope of the invention. In any case, it should be noted that the play which makes the associated connecting link a standby link is not necessarily applied between the secondary device and the beam or the emergency bracket, but could alternatively be between this secondary device and the spreader beam, without going beyond the scope of the invention.

The purpose of the invention is also an engine unit for aircraft comprising a structure such as the one which has just been presented, together with an engine attached on to this structure.

Finally, its object is an aircraft comprising at least one such engine unit.

Other advantages and characteristics of the invention will appear in the non-restrictive detailed disclosure below.

BRIEF DESCRIPTION OF THE DRAWINGS

This description will be made with reference to the attached illustrations, among which.

DETAILED DESCRIPTION OF PREFERRED EMBODIMENTS

Figure 1:
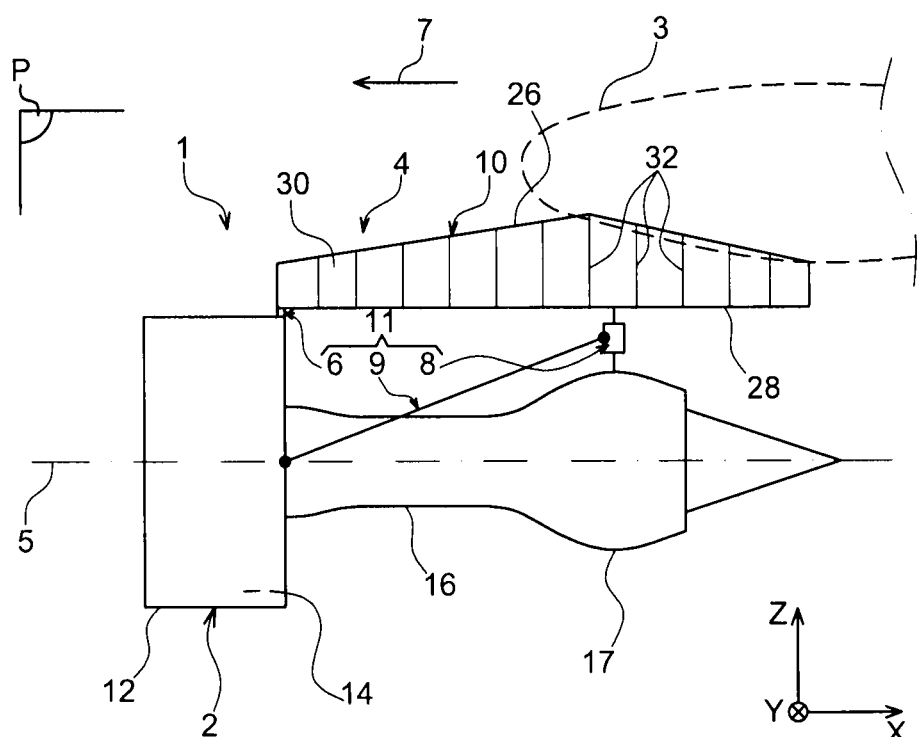
FIG. 1 represents a partially schematic side view of an engine unit for aircraft, comprising an engine mounting structure according to a preferred embodiment of the present invention.

With reference to FIG. 1, it shows an engine unit 1 for aircraft intended to be attached under a wing 3 of this aircraft, where this unit 1 forming the subject of the present invention is fitted with an engine mounting structure 4 taking the form of a preferred embodiment of the present invention.

Overall, engine unit 1 comprises an engine such as a jet engine 2 and engine mounting structure 4, where the latter is notably fitted with a rigid structure 10 and an engine mounting system 11 comprising multiple engine attachments 6, 8, and a system for transmission of thrust efforts 9 generated by jet engine 2, where mounting system 11 is therefore interposed between the engine and the abovementioned rigid structure 10; the latter is also called the primary structure. As an indication, it should be noted that unit 1 is intended to be surrounded by a nacelle (not represented), and that engine mounting structure 4 comprises another series of attachments (not represented) enabling this unit 1 to be suspended under the wing surface of the aircraft.

Throughout the disclosure, by convention, X refers to the longitudinal direction of structure 4 which is also comparable to the longitudinal direction of jet engine 2, this direction X being parallel to a longitudinal axis 5 of this jet engine 2. Further, Y refers to the direction which is transverse to structure 4 and also comparable to the transverse direction of jet engine 2, and Z to the vertical direction or the height; these three directions X, Y and Z are mutually orthogonal.

In addition, the terms "front" and "rear" must be considered relative to the forward direction of the aircraft imparted due to the thrust exerted by jet engine 2, and this direction is represented schematically by arrow 7.

In FIG. 1 it can be seen that only transmission system 9, engine fasteners 6 and 8, and rigid structure 10 of engine mounting structure 4 have been represented. The other unrepresented constituent elements of this structure 4, such as the means for mounting rigid structure 10 under the wing surface of the aircraft, and the secondary structure providing segregation and maintenance of the systems whilst supporting aerodynamic fairings, are traditional elements identical or similar to those found in the prior art, and known to the skilled man in the art. Consequently, no detailed disclosure will be made of them.

Jet engine 2 has at the front a large fan casing 12 demarcating an annular bypass duct 14, and comprises towards the rear a smaller central casing 16, enclosing the core of this jet engine. Finally, central casing 16 is extended to the rear by an ejection casing 17 which is larger than that of casing 16. Casings 12, 16 and 17 are naturally fixed one to another.

As can be seen in FIG. 1, system 11 is constituted by a front engine fastener 6, a rear engine fastener 8, and an attachment 9 forming a device for transmitting the thrust efforts generated by jet engine 2. As is shown schematically in FIG. 1, this system 9 takes the form of two lateral connecting rods (only one is visible due to it being a side view) connected firstly to a rear part of fan casing 12, and secondly to a spreader beam mounted in articulated fashion relative to caisson 10, as will be described in detail below.

Front engine attachment 6 is secured to fan casing 12, and is for example designed so as to be able to transmit efforts generated by jet engine 2 in the Y and Z directions, using shackles/small connecting rods. As an indication, this front attachment 6 preferably penetrates into a circumferential end part of fan casing 12.

Rear engine fastener 8 is, overall, interposed between ejection casing 17 and rigid structure 10 of the engine mounting structure. For its part, it is designed so as to be able to transmit efforts generated by jet engine 2 in directions Y and Z, and also those exerted in the X and Y directions, due to its particular cooperation with transmission system 9, which will be described below.

Again with reference to FIG. 1, it can be seen that structure 10 has the form of a caisson extending in direction X; this caisson is also called the torsion box. It is traditionally formed by an upper stringer 26 and a lower stringer 28, and also by two lateral panels 30 (a single one is visible in FIG. 1), both extending in direction X and roughly in an XZ plane. Within this caisson, transverse ribs 32 positioned in the YZ planes and spaced longitudinally reinforce the rigidity of the caisson. It should be noted as an indication that elements 26, 28 and 30 can each be constructed as a single piece, or alternatively through the assembly of jointed sections, which can possibly be slightly inclined relative to one another. In this case lower stringer 28 extends preferably in a plane which is inclined relative to horizontal, along its entire length, as shown in FIG. 1. The inclination is such that lower stringer 28, parallel to direction Y, approaches axis 5 as it goes to the rear, with the aim of approaching ejection casing 17 in order to enable rear engine attachment 8 to be positioned on this same casing 17. All the elements forming the caisson are preferably made from composite materials comprising a blend of resin and glass and/or carbon fibres.

Figure 2:
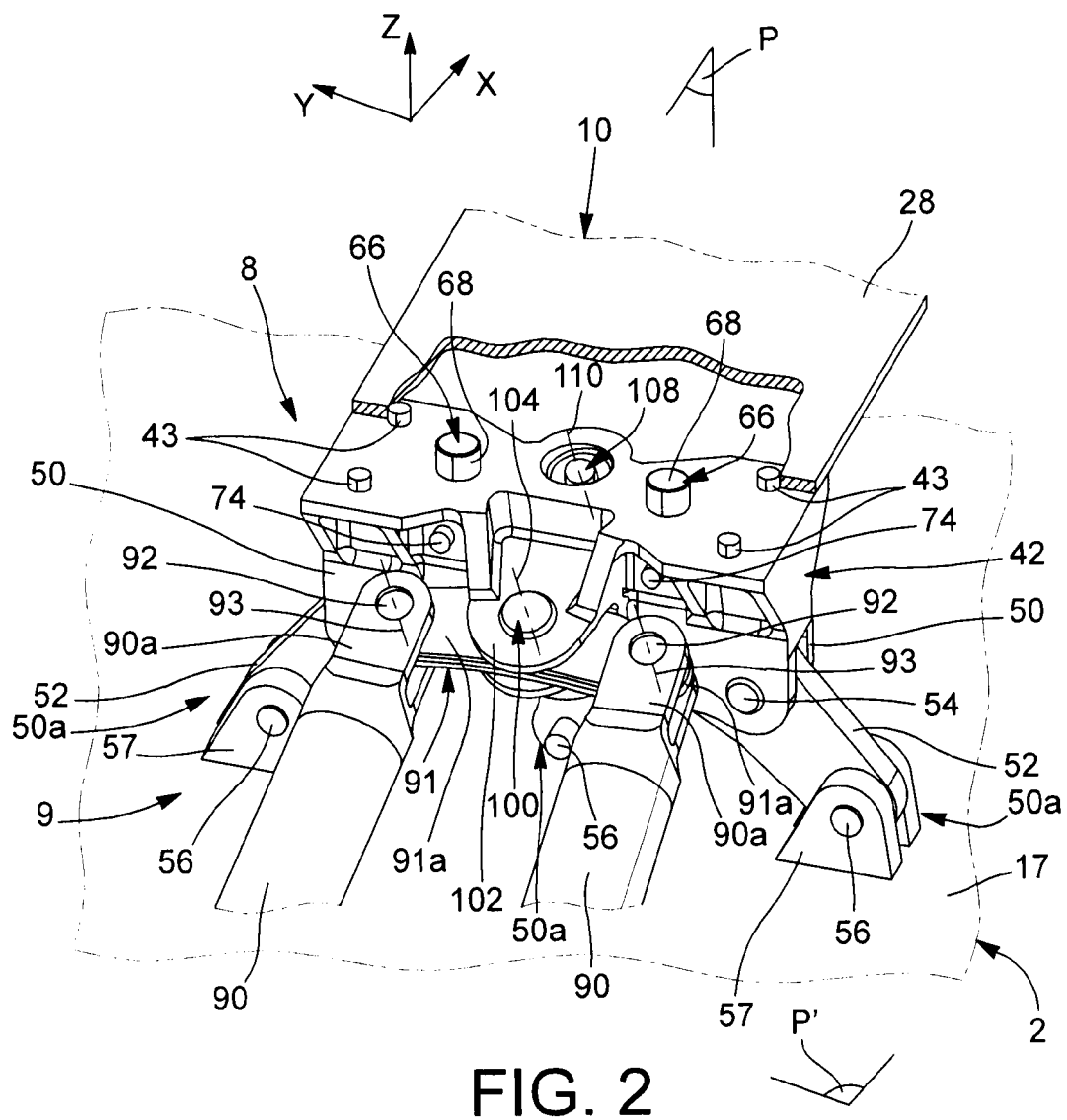
FIG. 2 represents a partial detailed perspective view of the rear part of the engine mounting system, belonging to the structure shown in FIG. 1.
Figure 3:
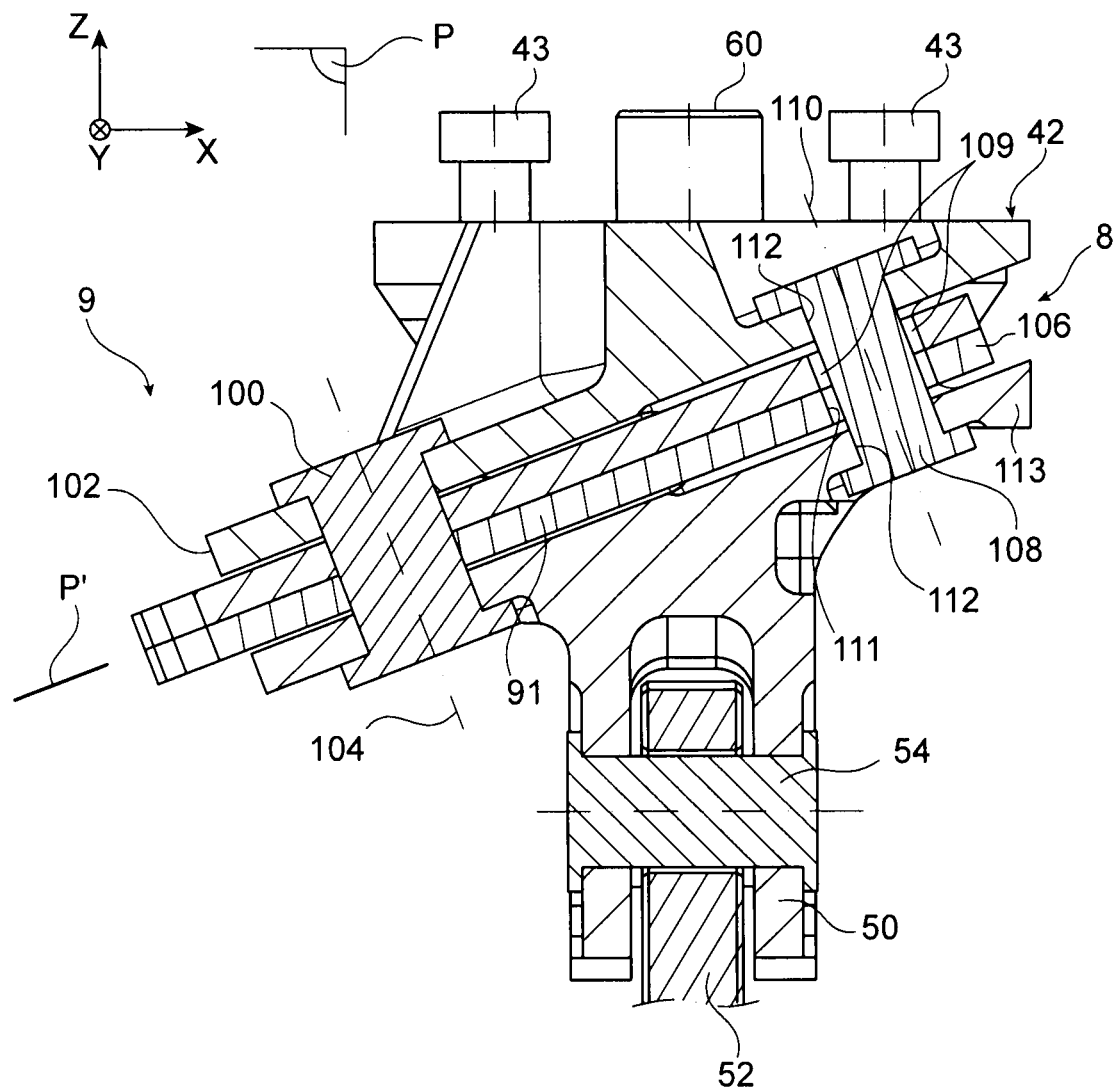
FIG. 3 represents a longitudinal section view passing through symmetry plane P of FIG. 2.
Figure 4:
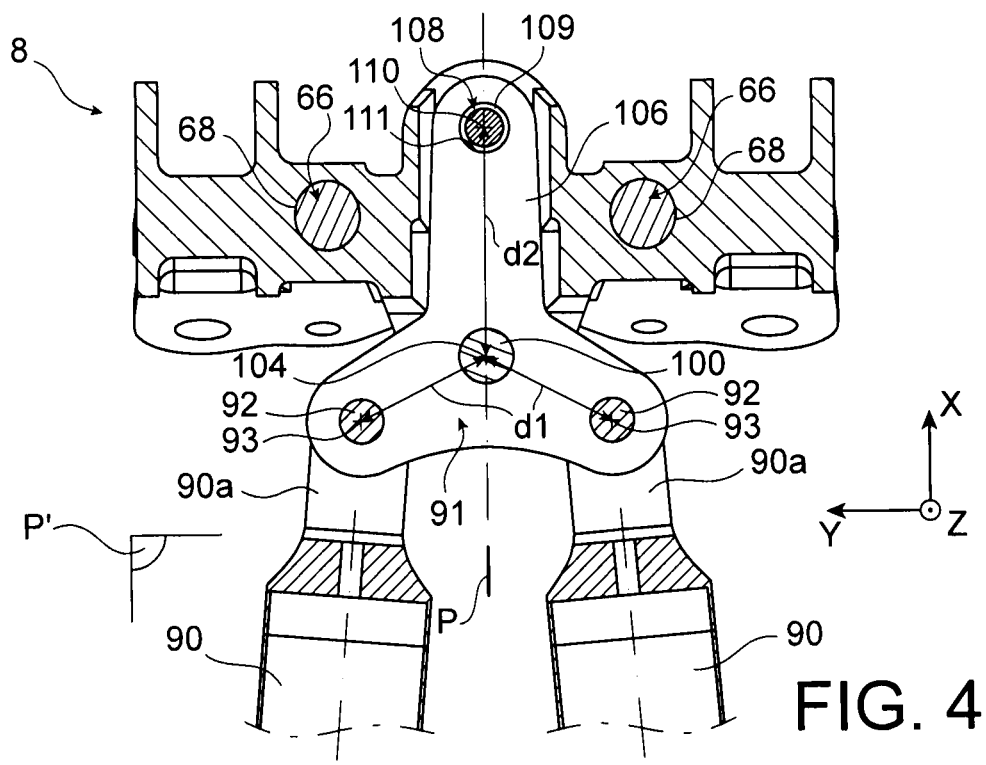
FIG. 4 represents a partial section view passing through the plane of spreader beam P' of FIGS. 2 and 3.

With reference to FIGS. 2 to 4, a part of rear engine attachment 8 and of the system for transmitting thrust efforts 9 can be seen, certain elements of which have been deliberately omitted, for obvious reasons of clarity.

Rear engine fastener 8 comprises a strut 42 comparable to a transverse beam constructed as a single piece, and mounted in fixed fashion on caisson 10, for example using vertical bolts 43 and vertical shearing slugs 66. Like the whole of rigid structure 10 and mounting system 11, this strut 42 positioned under lower stringer 28 has plane P, oriented in the X and Z directions, as its symmetry plane. This plane P can moreover be compared to a vertical symmetry plane of structure 4.

In the area of the opposite lateral ends, strut 42 comprises two fittings 50a each comprising a cap 50 on to which is connected a shackle 52 through an shaft 54 aligned in direction X. In addition, there is another shaft 56 oriented in direction X in the area of a lower end of shackle 52, so as to connect the latter to a bracket/cap 57 mounted in fixed fashion on to casing 17 of jet engine 2. In order to be able to tolerate the thermal expansions, shafts 54 and 56 are preferably ball-and-socket shafts.

Furthermore, a similar fitting 50a, which is represented only partially in FIG. 2, is also positioned between the two lateral fittings 50a which have just been described.

Thus, rear engine fastener 8 defines two lateral fasteners 50a and a central fastener 50a located between them, each capable of transmitting efforts being exerted in direction Y. Indeed, the efforts being exerted in this direction pass successively through brackets 57, shaft 56, shackle 52, shaft 54, attachment strut 42, shearing slugs 66, and are then introduced into caisson 10 via lower stringer 28.

With this regard, it should be noted that shearing slugs 66, which are aligned in direction Z, are therefore designed to allow the passage of the efforts in direction Y between rear attachment strut 42 and rigid structure 10 of the engine mounting structure.

Each slug 66, positioned at a lateral end of beam 42, comprises an upper end 68 located for example in the area of one of the frame-shaped transverse ribs 32 (not represented in FIGS. 2 to 4), where this end 68 moreover occupies a protruding position inside this frame, making it easily accessible. Slug 66 is then extended downwards, successively traversing the lower part of the rib concerned and lower stringer 28, and terminating with a lower end which protrudes downwards compared to stringer 28 of the caisson, and which is housed in an orifice (not represented) of rear attachment strut 42. It is therefore the contact between the surface of this lower end and that of the orifice of rear attachment strut 42 which allows the efforts to be transmitted in direction Y.

It should be noted that in order to transmit efforts in direction Y, a single one of the three fittings 50a may be sufficient. Thus, it is possible to have the two others mounted with some play, in particular in the area of shaft 52 and/or shaft 56, in order to make them inoperative in normal operation. Conversely, in the event of a failure of active fitting 50a in normal mode, one or both of the other fittings initially at standby become active, advantageously allowing a safety function known as "Fail Safe" to be provided for the transmission of the efforts in direction Y.

Moreover, there is preferably a pin 74 visible in FIG. 2, successively traversing a front part of strut 42, a bore (not visible) made in the lower end of slug 66, and a central part of the same strut 42.

With this particular positioning, in which pin 74, taking the form of a shaft, is preferably aligned in direction X, the cooperation between the bore and pin 74 consequently allows the efforts being exerted in direction X to be transmitted in the event of a failure/fracture of the vertical bolts 43. This advantageously enables a safety function known as a "Fail Safe" to be provided for the transmission of efforts in direction Z, without however increasing the complexity of the design of strut 42 appreciably. Furthermore, it should be noted that in order for this force pathway to be operative only following a failure/fracture of the vertical bolts 42 transmitting efforts in direction Z in normal mode, a functional play is then provided between pin 74 and the bore of slug 66.

Thrust efforts transmission device 9 will now be described in detail, still with reference to FIGS. 2 to 4.

Device 9 comprises globally two lateral connecting rods for transmission of thrust efforts 90, where each of these connecting rods has a forward end (not represented in these figures) connected to fan casing 12, for example on or near a horizontal median plane of jet engine 2.

Both lateral connecting rods 90, positioned either side of plane P, have a rear end 90a connected to a spreader beam 91 specific to the present invention.

More specifically, spreader beam 91 has two opposite lateral ends 91a, each mounted in connected fashion on its associated rear connecting rod end 90a. A mechanical link, constituting the link by which the thrust efforts are intended to transit in normal mode, is made using a connecting device 92 linking cap-shaped rear end 90a with the corresponding lateral spreader beam end 91a.

Preferably, the two devices 92 respectively define two connecting rod hinge lines 93, also called connecting rod rear end hinge lines. They are orthogonal compared to plane P' of connecting rods 90, and positioned, when seen from the front, either side of a principal spreader beam connecting device 100.

This device 100, which is traversed by plane P, enables spreader beam 91 to be connected to strut 42. Indeed, it traverses not only this spreader beam 91, but also a cap 102 which forms an integral part of beam 42, or which is attached in fixed fashion to the latter.

Principal device 100 then defines a principal spreader beam hinge line 104 positioned in plane P, and parallel to the abovementioned shafts 93.

This part of device 9 is roughly standard, in that, in "non-failing" normal operating mode, it allows the longitudinal efforts to be transited successively through connecting rods 90, connecting devices 92, preferably of the single-device type, and therefore not twinned, spreader beam 91, principal connecting device 100, preferably of the single-device type, and therefore not twinned, cap 102, attachment strut 42, vertical slugs 66, and then be introduced into caisson 10 via lower stringer 28 and the transverse rib concerned.

In a continuous manner, the centring of principal device 100 on spreader beam 91, in direction Y, enables the efforts transmitted by each of the two lateral connecting rods 90 to be balanced.

One of the specificities of the present invention lies in the design of spreader beam 91. Indeed, apart from its habitually found principal part, connected by device 100 and supporting lateral ends 91*a*, the spreader beam has a rear extension 106, located preferably in the same plane as the principal part, namely in plane P' defined by connecting rods 90.

In this way, it has overall the shape of a T constituted by a base and a bar, where the base is formed by the rear extension 106 and the bar by the principal part. In this configuration, connecting rods 90 are connected to the ends 91*a* of the bar of the T, and the active link in normal mode incorporating principal connecting device 100 is located at the intersection between the base and the bar of the T, where the base 106 is positioned in direction X as seen from above.

A fourth standby connecting link is, additionally, situated at the free end of base 106 of the T, for the assembly of spreader beam 91 on attachment strut 42.

More specifically, the free end of base 106 of the T is mounted in connected fashion with some play on strut 42 using a secondary connecting device of spreader beam 108, which is therefore located at the rear, notably when it is seen from above, compared to principal device 100.

The desired play 109 to make this mechanical link inoperative in normal mode is, for example, applied between connecting device 108 and an orifice 111 of base 106 which it traverses, as shown in FIG. 3, with the ends of organ 108 mounted in fixed fashion on strut 42, respectively in both opposite orifices 112 of strut 42. Nevertheless, a reverse situation could have consisted in having some play between device 108, preferably of the single-device type and therefore not twinned, and the two opposite orifices 112 of strut 42 housing respectively the two ends of device 108, with device 108 supported by spreader beam 91.

Finally, it is indicated that secondary connecting device 108 defines a secondary spreader beam hinge line 110, which is also positioned in plane P, and which is preferably parallel to the abovementioned shafts 93 and 104.

Figure 5:
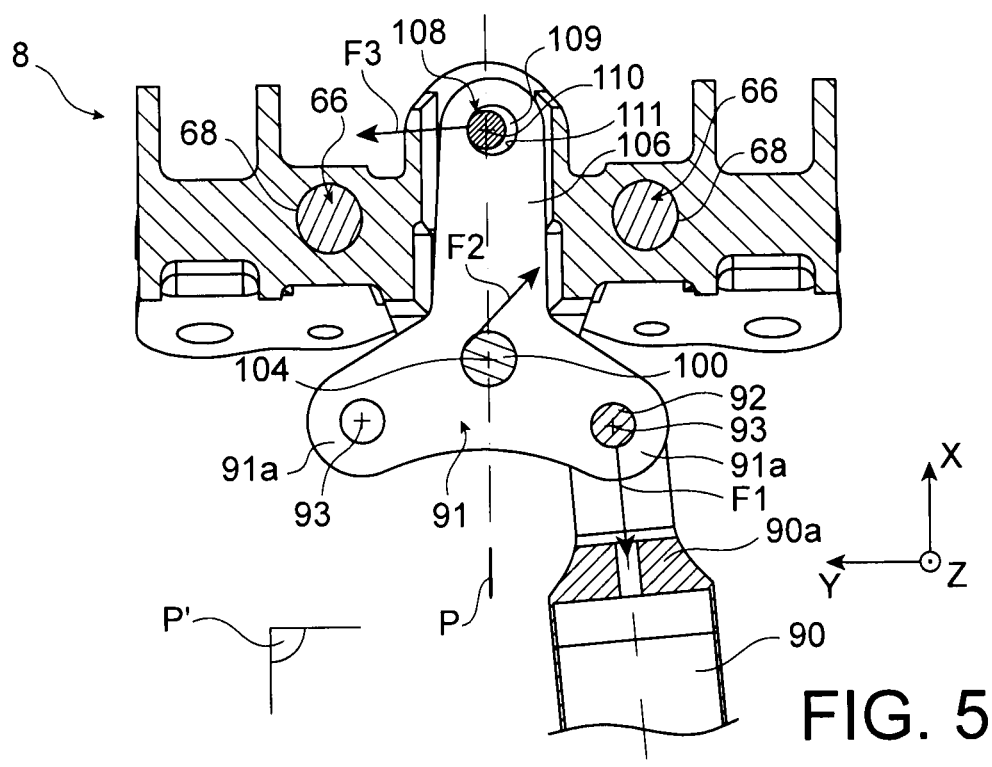
FIG. 5 represents a similar view to that of FIG. 4, in a configuration adopted following a failure of one of the two lateral thrust efforts transmission connecting rods.

With reference at present to FIG. 5, transmission device 9 can be seen in a failure mode, found after a failure of a connecting rod, taking for example the form of a fracture of this lateral connecting rod 90, or again of a fracture of its connecting device 92. When a failure of this type occurs, spreader beam 91, which is then connected only by a single connecting rod 90, swivels until the standby link incorporating secondary connecting device 108 becomes active, by consumption of play 109, and contact occurs between this device 108 with the wall of orifice 111 of flat spreader beam 91. Thus, despite the failure of one of the lateral connecting rods 90, spreader beam 91 remains subject to three balanced efforts, shown diagramatically by arrows F1, F2, F3 in FIG. 5, applied respectively at three points constituted by one of the two devices, principal device 100, and secondary device 108, where these three points preferably form a V the point of which is constituted by device 100.

The further secondary connecting device 108 is from device 100, the greater the observed leverage, and therefore the less high are efforts F1, F2, F3 transiting through spreader beam 91. Consequently, it is preferable that in plane P' of the spreader beam, the distance d1 between connecting device 93 is less than or equal to the distance d2 between hinge lines 104 and 110, where distances d1 and d2 are represented diagramatically in FIG. 4. Even more preferably, the ratio between d2 and d1 is around 2, and it is also indicated that distance d1 is preferably the same for both sides of the spreader beam.

Due to this positioning represented diagramatically in the figures, efforts F2 and F3 are respectively approximately 12% greater than F1 and 50% less than F1. As an indication, if d1 is identical to d2, then effort F2 is more than 40% greater than effort F1, and effort F3 is equal to effort F1. Moreover, if d2 is half d1, then efforts F2 and F3 are more than twice effort F1. Thus, it can be understood that due to spreader beam 91 traversing attachment strut 42 with its extension 106, distance d2 obtained between devices 100 and 108 is sufficiently large to lead to a reasonable dimensioning of device 18 and caps 102 and 113 receiving the spreader beam. This leads, advantageously, to an optimum encumbrance of strut 42, and of the entire rear part of the engine mounting system.

In addition, it should be noted that the thrust thus introduced in the event that a connecting rod 90 fails induces a torsion of attachment strut 42 around an imaginary axis which is in symmetry plane P and which is between the two pivot devices 100 and 108. The balance of strut 42 is then achieved by a torque of reactions in the area of vertical shearing slugs 66, and consequently a torque around an imaginary axis which is also in symmetry plane P, and which is also located between the two devices 100 and 108, bearing in mind the particular configuration of spreader beam 91 traversing strut 42.

Figure 6:
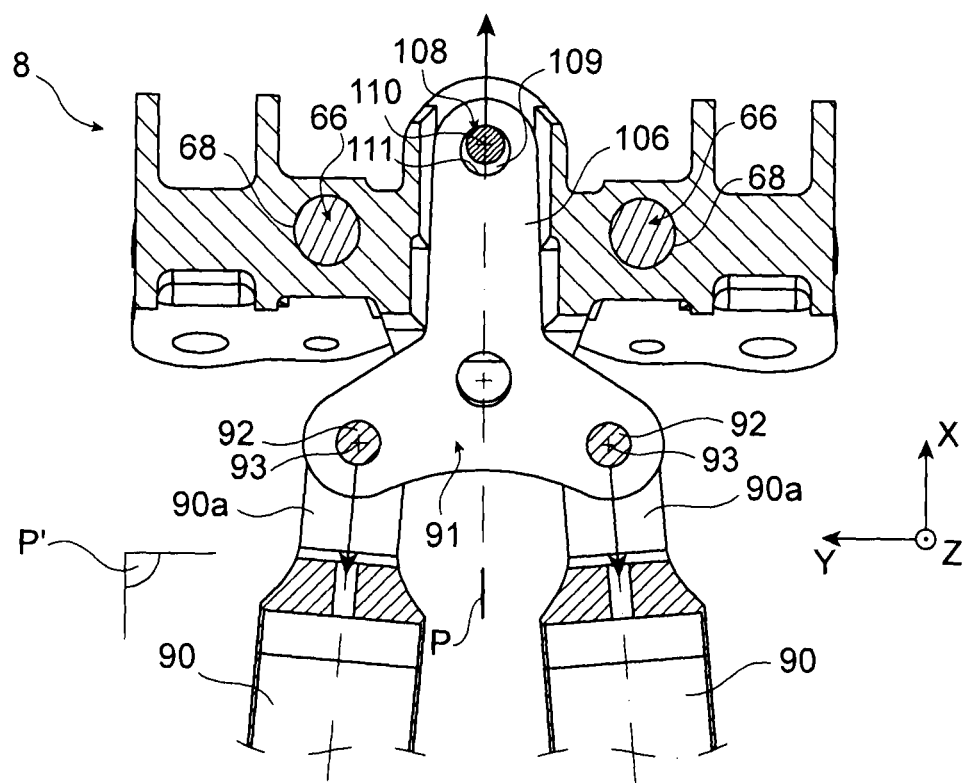
FIG. 6 represents a view similar to that of FIG. 4, in a configuration adopted following a failure in the principal spreader beam connecting device.

With reference at present to FIG. 6, transmission device 9 can be seen in a failing mode, found after a fracture of connecting device 100. When a failure of this type occurs, spreader beam 91, which is then connected only by the two connecting rods 90, moves longitudinally until the standby link incorporating secondary connecting device 108 becomes active, and contact occurs between this device 108 with the wall of orifice 111. Thus, despite the failure of its principal connecting device 108, spreader beam 91 remains subject to three balanced efforts, shown diagramatically by the arrows in FIG. 6, applied respectively at three points constituted by the two devices 92 and secondary device 108, where these three points preferably form a V the point of which is constituted by device 108. In this configuration, spreader beam 91 is then able to oscillate in secondary axis 110 defined by connecting device 108 traversed by plane P, and therefore enables the efforts transmitted by the two connecting rods 90 to be balanced, in a manner identical or similar to that observed in normal mode, when it oscillates around hinge line 104 of principal device 100.

Figure 7:
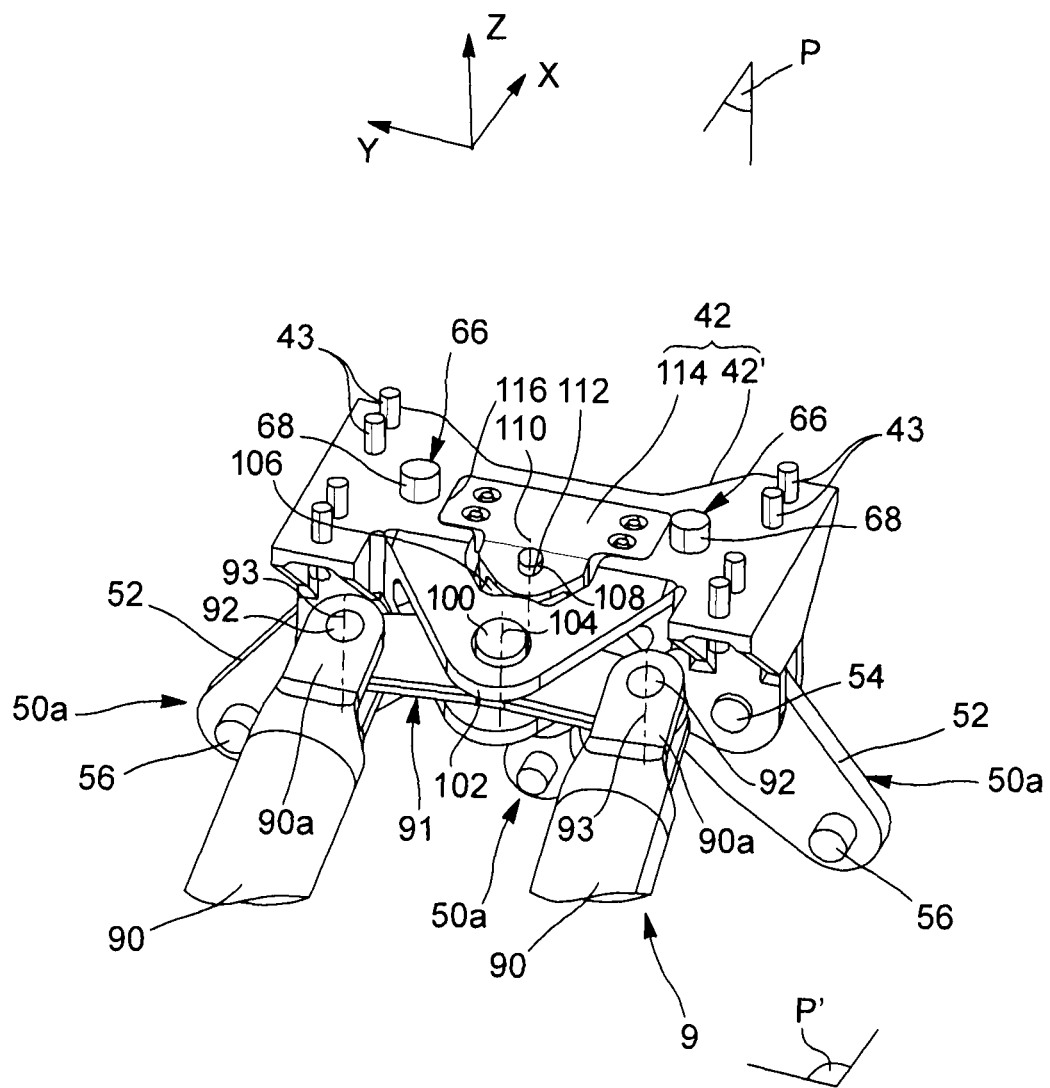
FIG. 7 represents a similar view to that shown in FIG. 2, with the rear part of the engine mounting system shown in the form of another preferred embodiment of the present invention.

In FIG. 7 showing another preferred embodiment of the present invention, it can be seen that attachment strut 42 is no longer shown in the form of a single beam constructed as a single piece, but of a similar transverse beam 42' to which is attached an emergency shackle 114 defining a cap. This emergency shackle 114 is mounted by bolting in a housing 116 made to this purpose in beam 42', and has, on both cap heads (a single cap head is visible in FIG. 7), respectively the two orifices 112 supporting secondary device 108, which traverses with some play extension 106 of spreader beam 91 in a manner comparable to that described above.

Naturally, various modifications can be made by the skilled man in the art to engine mounting structure 4 of jet engine 2 for aircraft which has just been described, only as an non-restrictive example. With this regard, it is possible notably to indicate that if structure 4 has been presented in an appropriate configuration for it to be suspended under the wing surface of the aircraft, this structure 4 could also have a different configuration enabling it to be mounted above this same wing surface.

The invention claimed is

1. An engine mounting structure for an aircraft engine, comprising:
    a rigid structure forming a caisson together with an engine mounting system mounted on the rigid structure and comprising a device to transmit thrust efforts generated by the engine, comprising two lateral connecting rods and a spreader beam mounted in connected fashion on a support element that is fixed relative to the caisson, through a principal spreader beam connecting device positioned between two lateral ends of the spreader beam on to which the two lateral connecting rods are respectively connected,
    wherein the support element comprises fittings on opposite lateral ends of the support element, each fitting including a cap on to which an upper end of a shackle is connected through a shaft aligned in a longitudinal direction of the rigid structure, and a lower end of the shackle is connected to a bracket fixedly mounted on a casing of the aircraft engine,
    wherein the principal spreader beam connecting device defines a principal spreader beam hinge line positioned in a plane that extends in the vertical direction and the longitudinal direction of the rigid structure,
    wherein the spreader beam is moreover mounted in connected fashion on the support element, using a secondary spreader beam connecting device located at a distance, seen from above, from the principal spreader beam connecting device, and defining a secondary spreader beam hinge line that is also positioned in the plane,
    wherein the secondary spreader beam connecting device is supported by one of the spreader beam or the support element, and traversing with a play the other of the spreader beam or the support element,
    wherein the secondary spreader beam connecting device is disposed behind the principal spreader beam connecting device and behind the fittings of the support element, and
    wherein in an event of a failure of either of the two lateral connecting rods, the rotation of the spreader beam around the principal spreader beam hinge line is stopped by the secondary spreader beam connecting device coming into contact with the spreader beam.

2. An engine mounting structure according to claim 1, wherein the engine mounting system comprises a rear engine fastener comprising an attachment strut to which is connected at least one shackle, configured to be connected to the engine, wherein the support element is the attachment strut.

3. An engine mounting structure according to claim 1, wherein the spreader beam has a shape of a T or a three-branched star.

4. An engine mounting structure according to claim 1, wherein the spreader beam is positioned in a plane corresponding to a plane defined by the thrust efforts transmission lateral connecting rods.

5. An engine mounting structure according to claim 4, wherein each connecting rod is mounted to the spreader beam at a connecting rod rear end hinge line, and wherein in the plane, the distance between the principal spreader beam hinge line and each connecting rod rear end hinge line is less than or equal to the distance between the principal spreader beam hinge line and the secondary spreader beam hinge line.

6. An engine mounting structure according to claim 1, wherein the plane constitutes a symmetry plane for the rigid structure and for the engine mounting system.

7. An engine mounting structure according to claim 1, wherein the attachment strut comprises a transverse beam on which is mounted an emergency shackle traversed with some play by the secondary spreader beam connecting device.

8. An engine unit for an aircraft comprising:
    an engine mounting structure according to claim 1, and
    an engine mounted in fixed fashion on to the structure.

9. An aircraft including at least one engine unit according to claim 8.

10. An engine mounting structure according to claim 1, wherein the spreader beam includes a rear extension which located in a plane defined by the connecting rods, and a free end of the rear extension is connected to the support element using the secondary spreader beam connecting device.

11. An engine mounting structure according to claim 5, wherein a ratio of the distance between the principal spreader beam hinge line and the secondary spreader beam hinge line to the distance between the principal spreader beam hinge line and each connecting rod rear end hinge line is around 2.

* * * * *